Sept. 18, 1923.

J. ROBINSON

DRIVING CONNECTION

Filed Aug. 30, 1921

Inventor
Joseph Robinson
By his Attorney
Gorham Crosby

Sept. 18, 1923.  1,468,402
J. ROBINSON
DRIVING CONNECTION
Filed Aug. 30, 1921  2 Sheets-Sheet 2
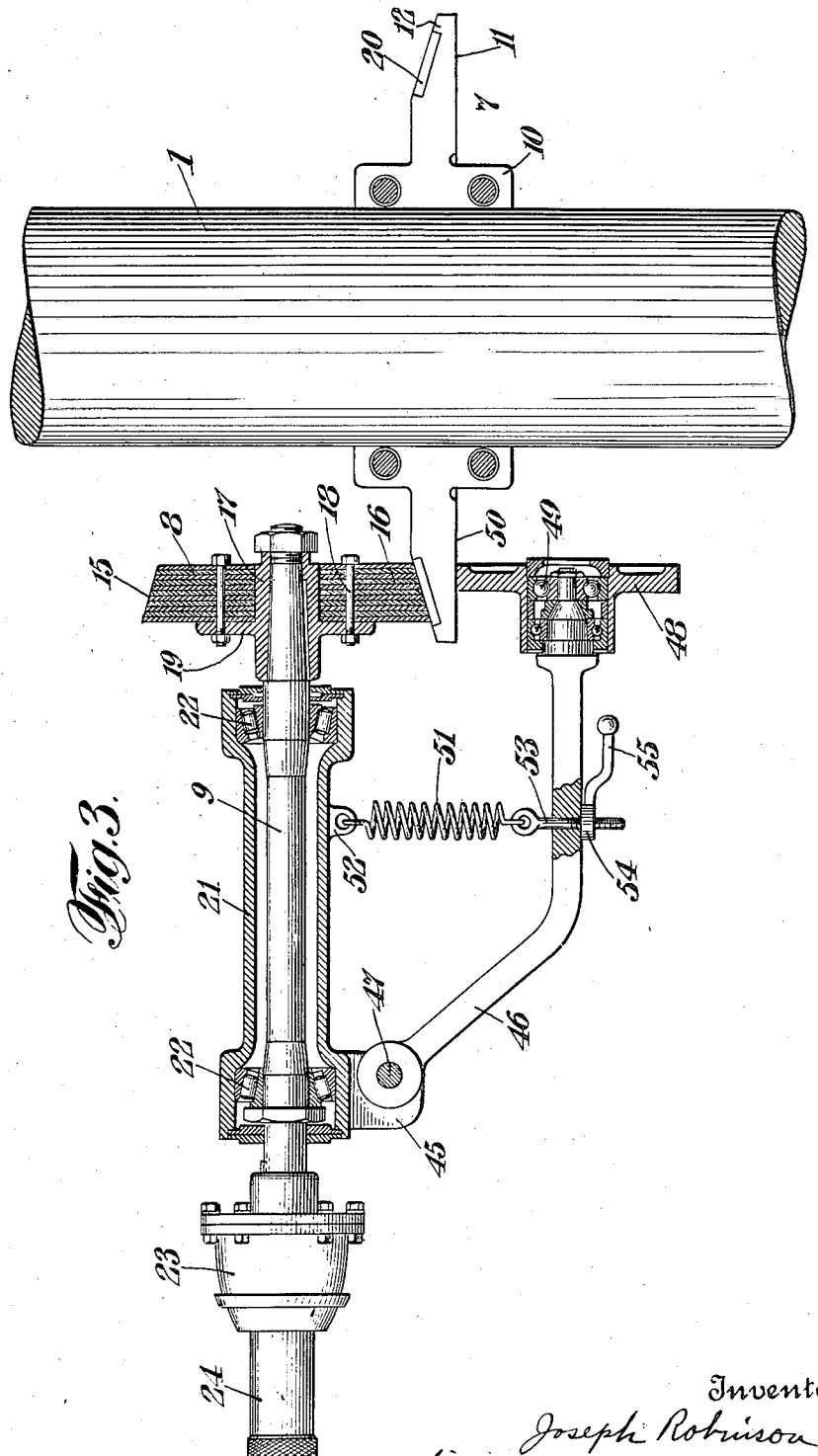

Patented Sept. 18, 1923.

1,468,402

UNITED STATES PATENT OFFICE.

JOSEPH ROBINSON, OF MORRISTOWN, NEW JERSEY.

DRIVING CONNECTION.

Application filed August 30, 1921. Serial No. 496,806.

*To all whom it may concern:*

Be it known that I, JOSEPH ROBINSON, a citizen of the United States, and resident of Morristown, in the county of Morris and State of New Jersey, have invented certain new and useful Improvements in Driving Connections, of which the following is a specification.

The invention relates to improvements in driving connections and particularly to improvements in the driving connections between the axle of a car and the generator for the lighting system.

In the production of a driving connection of the character contemplated herein, as between a car axle and a generator, which is preferably secured beneath the car body, various problems involving adjustments and relative motions between parts must be taken care of. There is a certain amount of play or relative movement between a car truck and the axles thereof, in the lengthwise direction of the axles and there is also relative movement in the operation of the train between the axle and truck, in a vertical direction. There is also, of course, relative movement between the truck and the car body, all of which factors have to be considered in the design of a connection of the character referred to between the axle and the generator.

One of the objects of the invention is the production of an improved and effective driving connection in train lighting systems, or other installations in which relative motions between parts must be considered, this connection involving the use of frictionally engaging driving and driven members. Other objects of the invention comprise various details of construction and combinations of parts all as will be more fully set forth in the following specification and particularly pointed out in the appended claims.

In order that a clearer understanding of the invention may be had attention is hereby directed to the accompanying drawings forming a part of this application and illustrating, by way of example, one embodiment of the invention. In the drawings:

Fig. 3 is an enlarged section taken on line 3—3 of Fig. 1.

Figure 1:
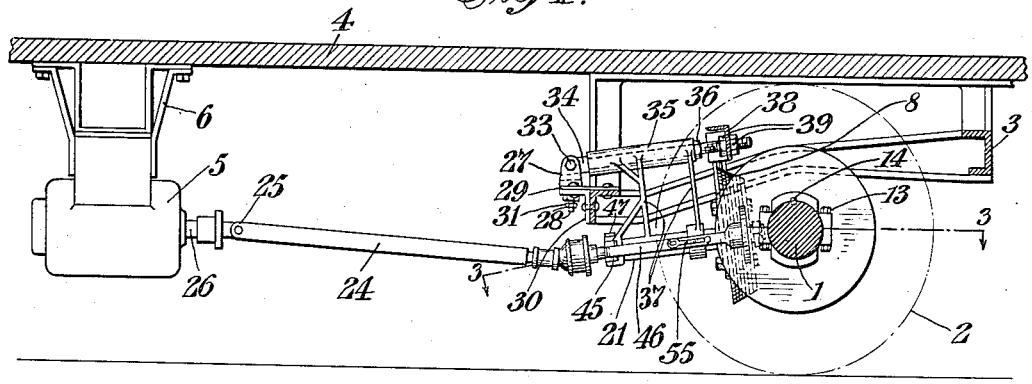
Fig. 1 represents a side elevation of a driving connection between a car axle and a generator mounted beneath the car body, embodying one form of the invention.

Referring to the drawings the axle 1 may be one of the axles of a railway car, one of the wheels of which is indicated at 2. A portion of the frame work of a car truck is indicated at 3, the body of the car being indicated at 4. The generator 5 may be supported by the car truck or beneath the car body, preferably the latter. In the drawings the generator is shown as supported by a bracket 6 depending from the under side of the car body.

The friction driving member 7 secured to axle 1 drives a friction member 8 on the end of the shaft 9 which forms part of the driving connections between the axle and the generator. Driving member 7 is preferably provided with a hub portion or portions 10 and outwardly extending web portion 11 on which the engaging face 12 is formed. Member 7 may be secured upon the axle in any suitable way as by forming the same in two sections which are bolted together about the axle by bolts 13 which extend through the hub portions 10 of the member, member 7 being keyed to the axle by a spline 14.

The driven member 8 is provided with a face 15 adapted to frictionally engage against the face 12 of member 7. The engaging faces of members 7 and 8 should be so formed as to engage each other with considerable friction. Member 8 may be formed of discs of fibrous material 16, or the like, which are mounted about a hub member 17 on shaft 9 and suitably secured together as by means of bolts 18 extending through the discs 16 and through a flange 19 on hub member 17.

In the construction shown shaft 9 extends substantially at right angles to axle 1 and the engaging faces of members 7 and 8 are suitably beveled or tapered to permit the same to engage. The face 12 of member 7 may be formed in any suitable manner to give the same a roughened or friction surface. In the drawings a member 20 of fibrous or other suitable friction material is illustrated as inserted within a suitable recess in the face 12 and suitably held in position therein.

Shaft member 9 is preferably mounted for rotation within a tubular housing member 21, shaft 9 being provided with suitable bearings within this housing member such, for example, as the roller bearings indicated at 22, 22. Shaft 9 is connected by universal joint 23 with a shaft 24 which may be connected by a universal joint 25 to the shaft 26 of the generator. An extension or telescoping joint may, of course, be included in the connections.

The housing 21 is mounted in such a manner as to permit movement thereof in the lengthwise direction of axle 1. Preferably it is pivotally supported from the car truck. In the construction shown a bracket 27 is pivotally mounted on a vertical pin 28 which is carried by the truck. Preferably one of the end rails of the car truck has a horizontal plate 29 secured thereon to overhang the rail. Pin 28 extends through plate 29 and the horizontal flange of a reinforcing member 30 and is secured in position by threading a nut 31 on the lower end of the pin.

Bracket 27 may be provided with upwardly extending ears 32 through which extends a horizontal pin 33 on which an arm 34 is mounted to oscillate in a vertical plane. Arm 34 has a cylindrical portion on which a sleeve member 35 is rotatably mounted. The cylindrical portion of arm 34 is screw threaded for a distance and nut 36 thereon may be screwed up against the end of sleeve member 35 to hold the latter in position between the nut and a suitable shoulder on member 34 at the other end of sleeve 35. Sleeve 35 is provided with downwardly extending arms 37 which are secured to the housing member 21 so that the latter is pivotally hung from member 34 to oscillate through an arc in a direction which is substantially parallel to axle 1.

The end of member 34 opposite to pivot 33 is preferably supported at a height which may be adjusted for the purpose of properly lining up shaft 9 at the proper height. The screw threaded end portion of member 34 extends through the downwardly extending flange of an angle bar 38 which may extend in a direction parallel to axle 1. Angle bar 38 may be secured in a desired position lengthwise of member 34 by adjustment of nuts 39 on opposite sides of the vertical flange of the angle member through which the threaded portion of member 34 extends.

Figure 2:
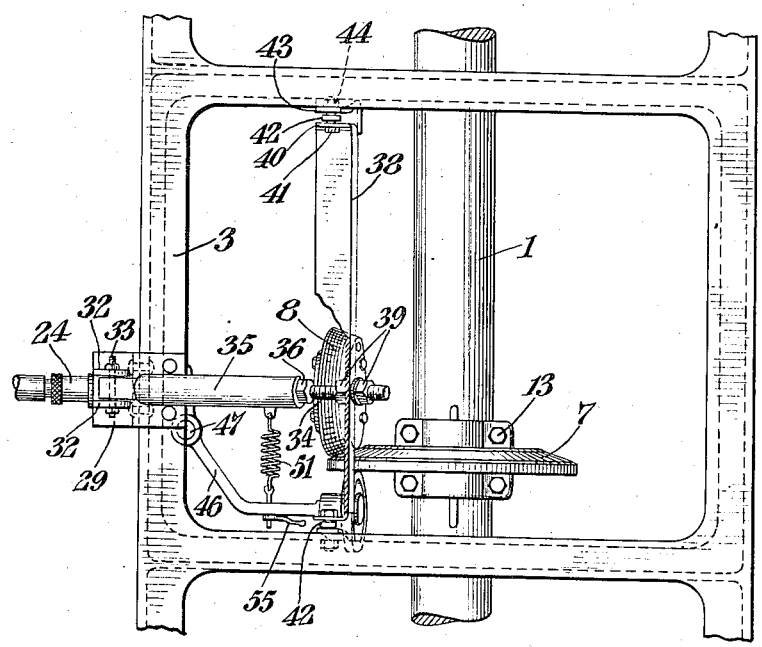
Fig. 2 is a top plan view of the driving connection between the car axle and the shaft driven thereby and connected parts.

Angle bar 38 is provided at each end with a downwardly extending flange 40 which is bent at right angle to the axial direction of axle 1. A pin 41 extends outwardly through each of these flanges 40. A threaded rod indicated in Fig. 2 at 42 is pivotally mounted at its upper end on each pin 41. The lower end portion of each rod 42 is threaded and extends through a flange of a bracket 43 secured to the adjacent portion of the car truck 3. The threaded portion of each rod 42 is provided with nuts above and below the horizontal flange of bracket 43 through which the same extends so that the angle bar 38 and the end of member 34 carried thereby may be raised or lowered by adjusting these nuts. The pins 41 on which the rods 42 are pivotally supported are also threaded and provided with nuts 44, pins 41 extending through vertical slots (not shown) in brackets 43. When angle bar 38 is to be adjusted nuts 44 may be loosened and the adjustment made by raising or lowering rods 42 as described whereupon nuts 44 will again be tightened to hold the parts in adjusted position. It is not thought necessary to illustrate the construction just described in greater detail because of the fact that the same is not part of my invention but is disclosed in the application Serial No. 466,906, filed May 5, 1921, by John P. Sunderland.

In the form of construction illustrated the driven friction member 8 is held resiliently in engagement with the driving member 7 by means of a member engaging against the opposite side of driving member 7 from that engaged by the driven member 8, these two members engaging opposite sides of member 7 being resiliently drawn towards each other at all times. Preferably housing 21 is provided with an ear or pair of ears 45. An arm or arms 46 are pivotally connected to the ear or ears 45 by pin 47. In the form illustrated a pair of ears 45, are shown between which the arm 46 extends. This arm may extend outwardly at an angle and then in a direction parallel to that of shaft 9 toward axle 1. A roller or disc 48 is rotatably mounted about the end of arm 46, ball bearings 49, or the like, preferably being provided for disc 48. The driving friction member 7 is provided with a plane surface 50 on its face opposite to that which is engaged by driven member 8 and roller 48 is adapted to bear against this surface 50.

Members 48 and 8 are resiliently drawn towards each other, in the construction illustrated, by means of a spiral spring 51, one end of which is secured to a lug 52 on housing 21. The other end of spring 51 is secured to arm 46. Spring 51 is preferably mounted in such a way as to enable the tension of the same to be adjusted. In the form of construction described spring 51 is secured to an eye-bolt 53, or the like, which extends through an opening in arm 46. The position of bolt 53 with reference to arm 46 may be adjusted by suitable means. A simple and effective construction is illustrated in which a nut 54 is shown as mounted upon the threaded periphery of bolt 53, this nut being drawn into engagement with arm 46 by the tension of spring 51. Nut 54 is provided with an outwardly extending handle 55 by which the same may be rotated in one direction, or the other, to increase or decrease the tension of spring 51.

It will be noted that the construction described holds the driven member 8 resiliently in engagement with the driving face of member 7 regardless of the lengthwise movements of axle 1 relative to car truck 3. Members 7 and 8 will also remain in driving relation during any relative movement between axle 1 and shaft 9 in the axial direction of the latter and during such relative movement between the car truck and the axle in a vertical direction as is likely to occur. In case any dirt or stone, or the like should get between the periphery of roller 48 and the surface 50 of driving member 7, spring 51 will yield to permit arm 46 to move outwardly sufficiently for roller 48 to clear the obstruction. Thus it will be seen that the construction described provides a driving connection which is extremely simple and at the same time effective during all conditions which will be met in practice.

It should be understood that the invention is not limited strictly to the details of construction described but is as broad as is indicated by the accompanying claims.

What I claim is:—

1. In a driving connection, the combination with a car axle and a generator, of a support pivoted to swing about a substantially horizontal axis, a shaft member leading to said generator at an angle to said axle, so supported by said support as to permit movement thereof in the lengthwise direction of the axle, friction discs on said shaft member and axle, arranged to engage each other, and means for holding said discs in driving engagement with each other regardless of any lengthwise movement of said axle relative to said support.

2. In a driving connection, the combination with a car axle and a generator, of a support, a shaft member leading to said generator at an angle to said axle, pivotally supported by said support to thereby permit movement thereof in the lengthwise direction of the axle, frictionally engaging driving and driven members on said axle and shaft member, adapted to maintain substantially constant engagement with each other, and means for resiliently holding said driving and driven members in engagement during lengthwise movement of said axle relative to said support.

3. In a driving connection, the combination with a car axle and a generator, of a support, a shaft member leading to said generator at an angle to said axle, so supported by said support as to permit movement thereof in the lengthwise direction of the axle, driving and driven members on said axle and shaft member, having faces adapted to frictionally engage each other, and means movable with said shaft member adapted to bear on the side of said driving member opposite to that engaged by said driven member.

4. In a driving connection, the combination with a car axle and a generator, of a support, a shaft member leading to said generator at an angle to said axle, so supported by said support as to permit movement thereof in the lengthwise direction of the axle, driving and driven members on said axle and shaft member, having faces adapted to frictionally engage each other, a member adapted to bear on the side of said driving member opposite to that engaged by said driven member, and means, comprising a spring, for drawing said driven member and last named member towards each other, to hold the same in engagement with opposite sides of said driving member.

5. In a driving connection, the combination with a driving shaft, of a support, a shaft member extending at an angle to said driving shaft and pivotally supported by said support about a substantially horizontal axis to permit movement thereof in the lengthwise direction of said driving shaft, friction members on said shaft and shaft member, arranged to engage each other, and means for holding said friction members in engagement with each other regardless of lengthwise movement of said driving shaft relative to said support.

6. In a driving connection, the combination with a driving shaft, of a support, a shaft member extending at an angle to said driving shaft and so supported by said support as to permit movement thereof in the lengthwise direction of said driving shaft, friction members on said shaft and shaft member, having faces adapted to frictionally engage each other, a member adapted to bear on a surface of said driving friction member opposite to that engaged by said driven friction member, and spring means for drawing said driven friction member and last named member towards each other, to hold the same resiliently in engagement with opposite sides of said driving friction member.

7. In a driving connection, the combination with a driving shaft, of a support, a shaft member extending at an angle to said driving shaft and so supported as to permit movement thereof in the lengthwise direction of said driving shaft, friction members on said shaft and shaft member, having faces adapted to frictionally engage each other, a housing for said shaft member, a member adapted to bear on a surface of said driving friction member opposite to that engaged by said driven friction member, an arm carrying said last named member, pivotally connected to said housing, and a spring connection between said housing and arm, adapted to hold said last named member and driven friction member resiliently in engagement with opposite sides of said driving friction member.

Signed at Montreal, P. Q., Canada this 17th day of August, A. D. 1921.

JOSEPH ROBINSON.